US012770922B2

(12) United States Patent
Kim et al.

(10) Patent No.: US 12,770,922 B2
(45) **Date of Patent: *Oct. 20, 2026**

(54) ELECTROLYTE FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Minseo Kim, Yongin-si (KR); Tae Jin Lee, Yongin-si (KR); Myungheui Woo, Yongin-si (KR); Dahyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 793 days.

This patent is subject to a terminal disclaimer.

(21) Appl. No.: 18/012,883

(22) PCT Filed: Mar. 30, 2022

(86) PCT No.: PCT/KR2022/095070

§ 371 (c)(1),
(2) Date: Dec. 23, 2022

(87) PCT Pub. No.: WO2023/003451

PCT Pub. Date: Jan. 26, 2023

(65) Prior Publication Data

US 2024/0128508 A1 Apr. 18, 2024

(30) Foreign Application Priority Data

Jul. 22, 2021 (KR) ........................ 10-2021-0096467

(51) Int. Cl.
*H01M 10/0567* (2010.01)
*H01M 4/38* (2006.01)
(Continued)

(52) U.S. Cl.
CPC ....... *H01M 10/0567* (2013.01); *H01M 4/386* (2013.01); *H01M 4/525* (2013.01);
(Continued)

(58) Field of Classification Search
None
See application file for complete search history.

(56) References Cited

U.S. PATENT DOCUMENTS 4,472,487 A 9/1984 Maxfield et al.
10,186,732 B2 1/2019 Yamamoto et al.
(Continued)

FOREIGN PATENT DOCUMENTS

CA 2242017 A1 12/1999
CN 102150315 A 8/2011
(Continued)

OTHER PUBLICATIONS

EPO Extended European Search Report dated Feb. 3, 2025, issued in corresponding European Patent Application No. 22846320.4, 9 pages.

(Continued)

*Primary Examiner* — Zhongqing Wei
(74) *Attorney, Agent, or Firm* — Womble Bond Dickinson (US) LLP

(57) ABSTRACT

Provided are an electrolyte for a rechargeable lithium battery including a non-aqueous organic solvent, a lithium salt, and an additive, wherein the additive is a composition including a first compound and a second compound, the first compound is a cesium salt compound, and the second compound includes a second compound represented by Chemical Formula 1A or Chemical Formula 1B, and a rechargeable lithium battery including the same.
Details of the above Chemical Formula 1A and Chemical Formula 1B are as described in the specification.

20 Claims, 1 Drawing Sheet

(51) Int. Cl.

| | |
|---|---|
| ***H01M 4/525*** | (2010.01) |
| ***H01M 4/583*** | (2010.01) |
| *H01M 4/02* | (2006.01) |
| *H01M 10/052* | (2010.01) |

(52) U.S. Cl.

CPC ...... *H01M 4/583* (2013.01); *H01M 2004/027* (2013.01); *H01M 2004/028* (2013.01); *H01M 10/052* (2013.01)

(56) References Cited

U.S. PATENT DOCUMENTS

| | | | | |
|---|---|---|---|---|
| 2006/0172201 | A1 | 8/2006 | Yasukawa et al. | |
| 2011/0159379 | A1 | 6/2011 | Matsumoto et al. | |
| 2013/0004840 | A1 | 1/2013 | Yu et al. | |
| 2015/0243969 | A1 | 8/2015 | Ku et al. | |
| 2018/0069235 | A1 | 3/2018 | Lee et al. | |
| 2019/0198924 | A1 | 6/2019 | Kim et al. | |
| 2019/0207258 | A1* | 7/2019 | Kim .................. | H01M 10/0567 |
| 2019/0267614 | A1 | 8/2019 | Lee et al. | |
| 2019/0296357 | A1 | 9/2019 | Seki et al. | |
| 2020/0212486 | A1 | 7/2020 | Xu et al. | |
| 2021/0020989 | A1 | 1/2021 | Choi et al. | |
| 2021/0242499 | A1 | 8/2021 | Hosoe et al. | |
| 2022/0069350 | A1* | 3/2022 | Cho .................. | H01M 10/0567 |

FOREIGN PATENT DOCUMENTS

| | | | |
|---|---|---|---|
| CN | 107799732 | A | 3/2018 |
| CN | 111217856 | A | 6/2020 |
| CN | 112086684 | A | 12/2020 |
| CN | 112239480 | A | 1/2021 |
| CN | 114106049 | A | 3/2022 |
| CS | 120154 | B6 | 10/1966 |
| EP | 3993125 | A2 | 5/2022 |
| JP | 2013-16515 | A | 1/2013 |
| JP | 2013-225388 | A | 10/2013 |
| JP | 6235313 | B2 | 11/2017 |
| JP | 2019-169292 | A | 10/2019 |
| JP | 6715096 | B2 | 7/2020 |
| KR | 10-1297172 | B1 | 8/2013 |
| KR | 10-2018-0027985 | A | 3/2018 |
| KR | 10-2018-0027996 | A | 3/2018 |
| KR | 10-2018-0129184 | A | 12/2018 |
| KR | 10-1980315 | B1 | 5/2019 |
| KR | 10-2192087 | B1 | 12/2020 |
| KR | 10-2021-0002038 | A | 1/2021 |
| KR | 10-2021-0010300 | A | 1/2021 |
| KR | 10-2021-0154023 | A | 12/2021 |
| KR | 10-2022-0026300 | A | 3/2022 |
| KR | 10-2022-0118191 | A | 8/2022 |
| WO | 99/23065 | A1 | 5/1999 |

OTHER PUBLICATIONS

International Search Report for corresponding Application No. PCT/KR2022/095070, dated Jul. 4, 2022, 2 pp.

Van Bommel, Kjeld J.C. et al. "Self-Assembled Monolayers on Gold for the Fabrication of Radioactive Stents" Advanced Functional Materials (2001) 7 pages.

Chen, Shengfu et al. "Strong Resistance of Phosphorylcholine Self-Assembled Monolayers to Protein Adsorption: Insights into Nonfouling Properties of Zwitterionic Materials" JACS Articles (2005) 6 pages.

Prishchenko, Andrey A. "Synthesis of New Types of N, N-Disubstituted Aminomethylspirophosphoranes" Heteroatom Chemistry (2010) 6 pages.

Xiong, Meng-Hua et al. "Bacteria-Responsive Multifunctional Nanogel for Targeted Antibiotic Delivery" Advanced Materials (2012) 25 pages.

Senda, Yasushi et al. "Cooperative Catalysis: Enantioselective Propargylic Alkylation of Propargylic Alcohols with Enecarbamates Using Ruthenium/Phosphoramide Hybrid Catalysts" (2015) 6 pages.

Extended European Search Report issued in corresponding EP Application No. 21190850.4, dated Jan. 17, 2022 (7 pages).

Extended European Search Report dated Jan. 25, 2024, of the corresponding European Patent Application No. 23154760.5 (5 pages).

US Notice of Allowance dated Sep. 25, 2024, issued in U.S. Appl. No. 17/397,033 (8 pages).

Korean Office Action dated Oct. 11, 2024 of the corresponding Korean Patent Application No. 10-2022-0093413 (5 pages).

Korean Notice of Allowance date May 13, 2025, of the corresponding Korean Patent Application No. 10-2022-0093413 (3 pages).

US Office Action dated Mar. 17, 2026, issued in U.S. Appl. No. 18/303,343 (11 pages).

Chinese Office Action corresponding to CN Application No. 202310106012.1, dated Mar. 9, 2026 (5 pages).

Chinese Notice of Allowance, with English translation, dated May 18, 2026, issued in Chinese Patent Application No. 202310106012.1 (6 pages).

Chinese Office Action corresponding to CN Application No. 202280025651.9, dated Jun. 26, 2026 (6 pages).

Korean Notice of Allowance corresponding to KR Application No. 10-2023-7026617, dated Sep. 7, 2026 (3 pages).

* cited by examiner

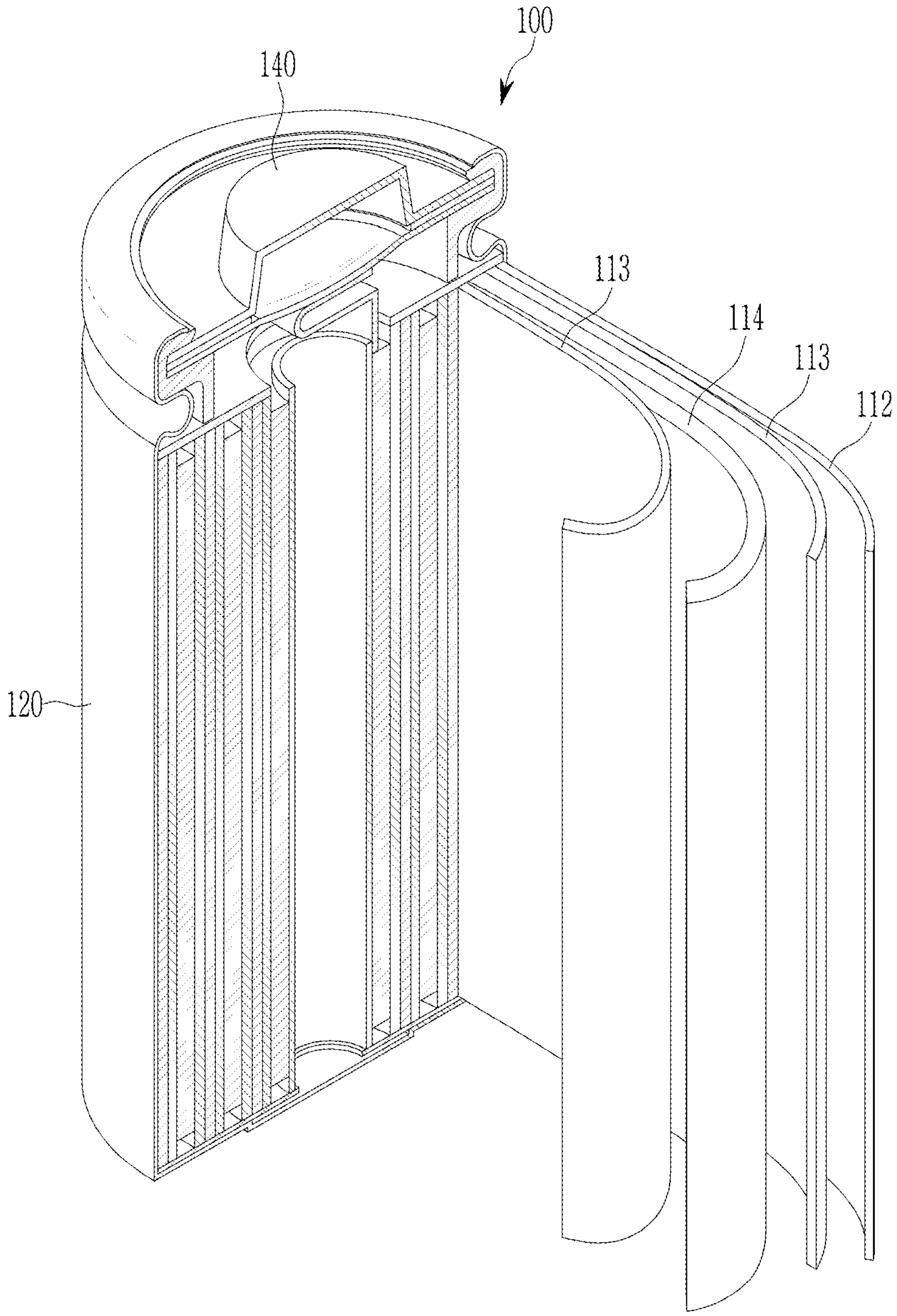
100
140
113
114
113
112
120

ELECTROLYTE FOR RECHARGEABLE LITHIUM BATTERY AND RECHARGEABLE LITHIUM BATTERY INCLUDING THE SAME

CROSS-REFERENCE TO RELATED APPLICATIONS

This application is a U.S. National Phase Patent Application of International Application Number PCT/KR2022/095070, filed on Mar. 30, 2022, which claims priority to Korean Patent Application Number 10-2021-0096467, filed on Jul. 22, 2021, the entire content of each of which is incorporated herein by reference.

TECHNICAL FIELD

This disclosure relates to an electrolyte for a rechargeable lithium battery and a rechargeable lithium battery including the same.

BACKGROUND ART

A rechargeable lithium battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a rechargeable lithium battery is manufactured by injecting an electrolyte into a battery cell, which includes a positive electrode including a positive electrode active material capable of intercalating/deintercalating lithium ions and a negative electrode including a negative electrode active material capable of intercalating/deintercalating lithium ions.

Particularly, the electrolyte uses an organic solvent in which a lithium salt is dissolved, and such an electrolyte is important in determining stability and performance of a rechargeable lithium battery.

$LiPF_6$, which is most commonly used as a lithium salt of the electrolyte, has a problem of accelerating the depletion of the solvent and generating a large amount of gas by reacting with the organic solvent of the electrolyte. When $LiPF_6$ decomposes, LiF and $PF_5$ are produced, which causes electrolyte depletion in the battery, resulting in high-temperature performance degradation and poor safety.

Accordingly, there is a demand for an electrolyte with improved safety without performance deteriorate even at high-temperature condition.

DISCLOSURE

Technical Problem

An embodiment provides an electrolyte for a rechargeable lithium battery having improved high-temperature performance, thermal stability, and penetration stability.

Another embodiment provides a rechargeable lithium battery having improved high-temperature safety and high-temperature reliability by applying the electrolyte, and in particular, improved high-temperature storage characteristics by reducing gas generation during high-temperature storage.

Technical Solution

An embodiment of the present invention provides an electrolyte for a rechargeable lithium battery including a non-aqueous organic solvent, a lithium salt, and an additive, wherein the additive is a composition including a first compound and a second compound, the first compound is a cesium salt compound, and the second compound is represented by Chemical Formula 1A or Chemical Formula 1B.

[Chemical Formula 1A]

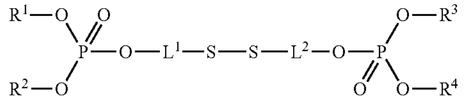

[Chemical Formula 1B]

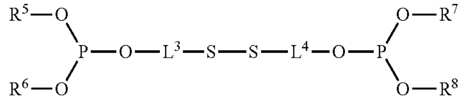

In Chemical Formula 1A and Chemical Formula 1B, $R^1$ to $R^8$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, $R^1$ to $R^8$ are each independently present, or at least one selected from a group comprising $R^1$ and $R^2$; $R^3$ and $R^4$; $R^5$ and $R^6$; and $R^7$ and $R^8$ are linked to form a substituted or unsubstituted monocyclic or polycyclic aliphatic heterocycle or a substituted or unsubstituted monocyclic or polycyclic aromatic heterocycle, and $L^1$ to $L^4$ are each independently a substituted or unsubstituted C1 to C20 alkylene group.

An anion of the cesium salt compound may be an imide-based anion or a phosphate-based anion.

The cesium salt compound may be represented by Chemical Formula 2 or 3.

[Chemical Formula 2]

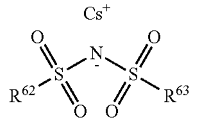

[Chemical Formula 3]

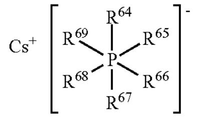

In Chemical Formula 2 and Chemical Formula 3, $R^{62}$ to $R^{69}$ are each independently a fluoro group or a C1 to C4 fluoroalkyl group substituted with at least one fluoro group.

Chemical Formula 2 may be represented by Chemical Formula 2-1 or 2-2.

[Chemical Formula 2-1]

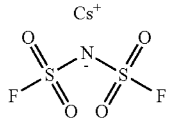

[Chemical Formula 2-2]

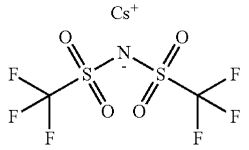

Chemical Formula 3 may be represented by Chemical Formula 3-1.

[Chemical Formula 3-1]

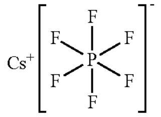

The first compound may be included in an amount of 0.05 to 3 parts by weight based on 100 parts by weight of the electrolyte for the rechargeable lithium battery.

Chemical Formula 1A may be represented by Chemical Formula 1A-I or Chemical Formula 1A-II.

[Chemical Formula 1A-I]

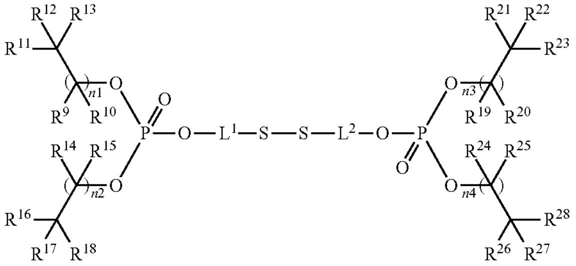

In Chemical Formula 1A-I, $R^9$ to $R^{28}$ are each independently hydrogen, a halogen group, or a substituted or unsubstituted C1 to C10 alkyl group, n1 to n4 are each independently one of integers ranging from 0 to 4, and $L^1$ and $L^2$ are each independently a substituted or unsubstituted C1 to C20 alkylene group;

[Chemical Formula 1A-II]

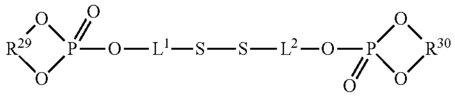

wherein, in Chemical Formula 1A-II, $R^{29}$ and $R^{39}$ are each independently a substituted or unsubstituted C2 to C10 alkylene group, and $L^1$ and $L^2$ are each independently a substituted or unsubstituted C1 to C20 alkylene group.

Chemical Formula 1A-II may be represented by Chemical Formula 1A-II-1 or Chemical Formula 1A-II-2.

[Chemical Formula 1A-II-1]

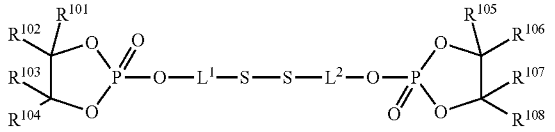

[Chemical Formula 1A-II-2]

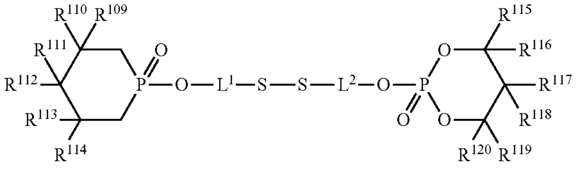

In Chemical Formula 1A-II-1 and Chemical Formula 1A-II-2, $R^{101}$ to $R^{120}$ are each independently hydrogen, a halogen group, or a substituted or unsubstituted C1 to C10 alkyl group, and $L^1$ and $L^2$ are each independently a substituted or unsubstituted C1 to C20 alkylene group.

Chemical Formula 1B may be represented by Chemical Formula 1B-I or Chemical Formula 1B-II.

[Chemical Formula 1B-I]

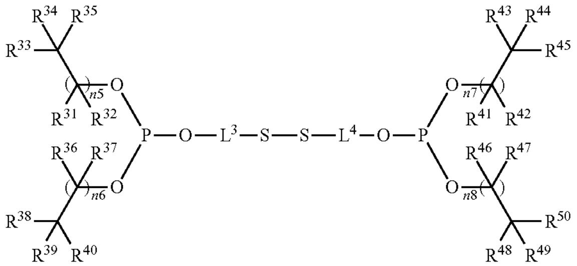

In Chemical Formula 1B-I, $R^{31}$ to $R^{50}$ are each independently hydrogen, a halogen group, or a substituted or unsubstituted C1 to C10 alkyl group, n5 to n8 are each independently one of integers ranging from 0 to 4, and $L^3$ and $L^4$ are each independently a substituted or unsubstituted C1 to C20 alkylene group;

[Chemical Formula 1B-II]

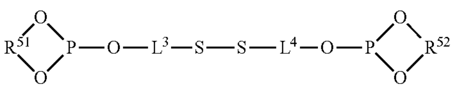

wherein, in Chemical Formula 1B-II, $R^{51}$ and $R^{52}$ are each independently a substituted or unsubstituted C2 to C10 alkylene group, and $L^3$ and $L^4$ are each independently a substituted or unsubstituted C1 to C20 alkylene group.

Chemical Formula 1B-II may be represented by Chemical Formula 1 B-II-1 or Chemical Formula 1 B-II -2.

[Chemical Formula 1B-II-1]

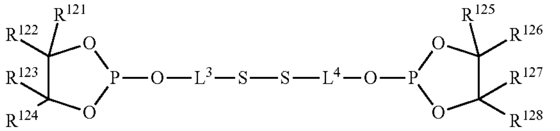

[Chemical Formula 1B-II-2]

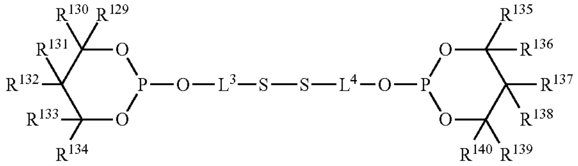

In Chemical Formula 1B-II-1 and Chemical Formula 1B-II-2, $R^{121}$ to $R^{140}$ are each independently hydrogen, a halogen group, or a substituted or unsubstituted C1 to C10 alkyl group, and $L^3$ and $L^4$ are each independently a substituted or unsubstituted C1 to C20 alkylene group.

The second compound may be represented by Chemical Formula 1A-II-3 or Chemical Formula 1B-II-3.

[Chemical Formula 1A-II-3]

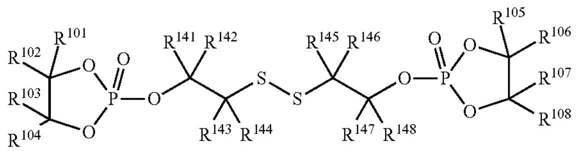

[Chemical Formula 1B-II-3]

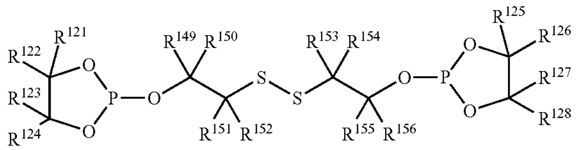

In Chemical Formula 1A-II-3 and Chemical Formula 1B-II-3,

R101 to R108, R121 to $R^{128}$, and $R^{141}$ to $R^{156}$ are each independently hydrogen, a halogen group, or a substituted or unsubstituted C1 to C10 alkyl group.

The second compound may be included in an amount of 0.05 to 5 parts by weight based on 100 parts by weight of the electrolyte for the rechargeable lithium battery.

The composition may be included in an amount of 0.5 to 8.0 parts by weight based on 100 parts by weight of the electrolyte for the rechargeable lithium battery.

Another embodiment of the present invention provides a rechargeable lithium battery including a positive electrode including a positive electrode active material, a negative electrode including a negative electrode active material, and the aforementioned electrolyte for a rechargeable lithium battery.

The positive electrode active material may be represented by Chemical Formula 6 below.

[Chemical Formula 6]

$$Li_xM^1_yM^2_zM^3_{1-y-z}O_{2-a}X_a$$

In Chemical Formula 6, $0.5 \leq x \leq 1.8$, $0 \leq a \leq 0.05$, $0 < y \leq 1$, $0 \leq z \leq 1$, $0y+z \leq 1$, $M^1$, $M^2$, and $M^3$ each independently include one or more element selected from a metal such as Ni, Co, Mn, Al, B, Ba, Ca, Ce, Cr, Fe, Mo, Nb, Si, Sr, Mg, Ti, V, W, Zr, or La, and a combination thereof, and X include one or more element selected from F, S, P, and Cl.

In Chemical Formula 6, $0.8 \leq y \leq 1$, $0 \leq z \leq 0.2$, and $M^1$ may be Ni.

The negative electrode active material may be graphite or may include a Si composite and graphite together.

The Si composite may include a core including Si-based particles and an amorphous carbon coating layer.

The Si-based particle may include one or more of a Si—C composite, $SiO_x$ ($0<x \leq 2$), and a Si alloy.

The Si—C composite may include a core including Si particles and crystalline carbon and an amorphous carbon coating layer on the surface of the core, and an average particle diameter of the Si particles may be 50 nm to 200 nm.

Advantageous Effects

Due to the additive with improved thermal safety, it is possible to implement a rechargeable lithium battery having improved high-temperature characteristics by suppressing an increase in internal resistance and generation of gas after being left at a high temperature, and by suppressing a voltage drop.

DESCRIPTION OF THE DRAWINGS

FIG. 1 is a schematic view showing a rechargeable lithium battery according to an embodiment of the present invention.

DESCRIPTION OF SYMBOLS

100: rechargeable lithium battery
112: negative electrode
113: separator
114: positive electrode
120: battery case
140: sealing member

MODE FOR INVENTION

Hereinafter, a rechargeable lithium battery according to an embodiment of the present invention will be described in detail with reference to the accompanying drawings. However, these embodiments are exemplary, the present invention is not limited thereto and the present invention is defined by the scope of claims.

In the present specification, unless otherwise defined, "substituted" means that at least one hydrogen in a substituent or compound is deuterium, a halogen group, a hydroxyl group, an amino group, a substituted or unsubstituted C1 to C30 amine group, a nitro group, a substituted or unsubstituted C1 to C40 silyl group, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C20 alkoxy group, a C1 to C10 fluoroalkyl group, a cyano group, or a combination thereof.

In one example of the present invention, "substituted" refers to replacement of at least one hydrogen of a substituent or a compound by deuterium, a halogen, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C10 fluoroalkyl group, or a cyano group. In addition, in specific examples of the present invention, "substituted" refers to replacement of at least on hydrogen of a substituent or a compound by deuterium, a halogen, a C1 to C20 alkyl group, a C6 to C30 aryl group, a C1 to C10 fluoroalkyl group, or a cyano group. In addition, in specific examples of the present invention, "substituted" refers to replacement of at least one hydrogen of a substituent or a compound by deuterium, a halogen, a C1 to C5 alkyl group, a C6 to C18 aryl group, a C1 to C5 fluoroalkyl group, or a cyano group. In addition, in specific examples of the present invention, "substituted" refers to replacement of at least one hydrogen of a substituent or a compound by deuterium, a cyano group, a halogen, a methyl group, an ethyl group, a propyl group, a butyl group, a phenyl group, a biphenyl group, a terphenyl group, a trifluoromethyl group, or a naphthyl group.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a rechargeable lithium battery, a cylindrical rechargeable lithium battery is for example described. FIG. 1 schematically illustrates the structure of a rechargeable lithium battery according to an embodiment. Referring to FIG. 1, a rechargeable lithium battery 100 according to an embodiment includes a battery cell including a positive electrode 114, a negative electrode 112 facing the positive electrode 114, a separator 113 between the positive electrode 114 and the negative electrode 112, and an electrolyte (not shown) impregnating the positive electrode 114, negative electrode 112, and separator 113, a battery case 120 housing the battery cell, and a sealing member 140 sealing the battery case 120.

Hereinafter, a more detailed configuration of the rechargeable lithium battery 100 according to an embodiment of the present invention will be described.

A rechargeable lithium battery according to one embodiment of the present invention includes an electrolyte, a positive electrode, and a negative electrode.

The electrolyte includes a non-aqueous organic solvent, a lithium salt, and an additive, wherein the additive is a composition including a first compound and a second compound, the first compound is a cesium salt compound, and the second compound is represented by Chemical Formula 1A or Chemical Formula 1B.

[Chemical Formula 1A]

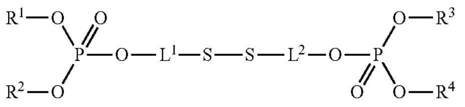

[Chemical Formula 1B]

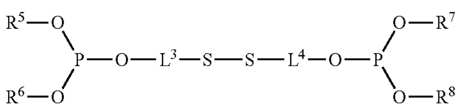

In Chemical Formula 1A and Chemical Formula 1B, $R^1$ to $R^8$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group or a substituted or unsubstituted C6 to C20 aryl group, $R^1$ to $R^8$ are each independently present, or at least one selected from a group comprising $R^1$ and $R^2$; $R^3$ and $R^4$; $R^5$ and $R^6$; and $R^7$ and $R^8$ are linked to form a substituted or unsubstituted monocyclic or polycyclic aliphatic heterocycle or a substituted or unsubstituted monocyclic or polycyclic aromatic heterocycle, and $L^1$ to $L^4$ are each independently a substituted or unsubstituted C1 to C20 alkylene group.

The first compound is a cesium salt compound, wherein the first compound is decomposed in the electrolyte to form a film on the positive and the negative electrode surfaces and thus effectively control elution of lithium ions generated from the positive electrode and resultantly, prevent decomposition of the positive electrode. Specifically, the first compound is earlier reduced and decomposed than a carbonate-based solvent included in the non-aqueous organic solvent to form an SEI (Solid Electrolyte Interface) film on the negative electrode and thus prevent decomposition of the electrolyte and the resulting decomposition of the electrode and resultantly, suppress an increase in internal resistance due to gas generation. A portion of the SEI film on the negative electrode is decomposed through the reduction reaction during the charge and discharge, moves toward the positive electrode surface, and also forms a film on the positive electrode surface through an oxidation reaction to prevent the decomposition of the positive electrode surface and oxidation reaction of the electrolyte, contributing to improving high-temperature and low-temperature cycle-life characteristics.

In other words, the composition includes the first compound represented by Chemical Formula 1, improving cycle-life characteristics and safety of the battery.

In addition, the composition includes a bisphosphate-based or bisphosphite-based compound as the second compound and forms each film on the positive and negative electrode surfaces during the high-temperature storage to suppress the resistance increase in the film and improve stability of the film, resulting in having an effect of improving high-temperature cycle-life and thermal safety characteristics.

The second compound is represented by Chemical Formula 1A or Chemical Formula 1B and has a structure that two phosphate moieties or two phosphite moieties are linked by a disulfide linker.

As this compound is decomposed into two phosphate-based compounds or two phosphite-based compounds centering on the disulfide linker, each film is formed on the positive and negative electrode surfaces.

In summary, when the first compound and the second compound are used in combination, compared with when each compound alone is used, the film is more firmly formed on the positive and negative electrode surfaces, further improving high-temperature storage characteristics.

For example, the anion of the cesium salt compound may be an imide-based anion or a phosphate-based anion.

As a specific example, the cesium salt compound may be represented by Chemical Formula 2 or 3.

[Chemical Formula 2]

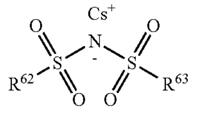

[Chemical Formula 3]

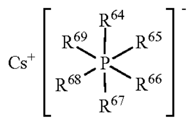

In Chemical Formula 2 and Chemical Formula 3, $R^{62}$ to $R^{69}$ are each independently a fluoro group or a C1 to C4 fluoroalkyl group substituted with at least one fluoro group.

For example, $R^{62}$ to $R^{69}$ in Chemical Formulas 2 and 3 may each independently be a fluoro group or a C1 to C4 fluoroalkyl group substituted with at least two fluoro groups.

For example, $R^{62}$ to $R^{69}$ in Chemical Formulas 2 and 3 may each independently be a fluoro group or a C1 to C4 fluoroalkyl group substituted with at least three fluoro groups.

As a specific example, $R^{62}$ to $R^{69}$ in Chemical Formulas 2 and 3 may each independently be a fluoro group or a C1 to C3 fluoroalkyl group substituted with at least three fluoro groups.

As a more specific example, $R^{62}$ to $R^{69}$ in Chemical Formulas 2 and 3 may each independently be a fluoro group or a C1 to C2 fluoroalkyl group substituted with at least three fluoro groups.

For example, Chemical Formula 2 may be represented by Chemical Formula 2-1 or 2-2.

[Chemical Formula 2-1]

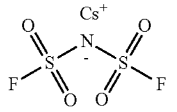

[Chemical Formula 2-2]

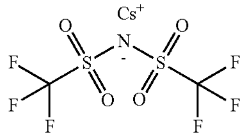

For example, Chemical Formula 3 may be represented by Chemical Formula 3-1.

[Chemical Formula 3-1]

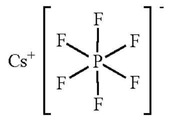

For example, the first compound may be included in an amount of 0.05 to 3 parts by weight, for example, 0.05 to 2 parts by weight, 0.1 to 2 parts by weight, or 0.1 to 1 part by weight, based on 100 parts by weight of the electrolyte for the rechargeable lithium battery.

For example, Chemical Formula 1A may be represented by Chemical Formula 1A-I or Chemical Formula 1A-II.

[Chemical Formula 1A-I]

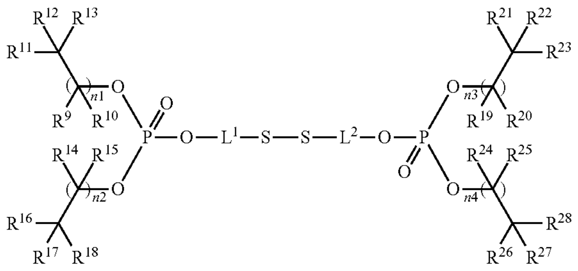

In Chemical Formula 1A-I, $R^9$ to $R^{28}$ are each independently hydrogen, a halogen group, or a substituted or unsubstituted C1 to C10 alkyl group, n1 to n4 are each independently one of integers ranging from 0 to 4, and $L^1$ and $L^2$ are each independently a substituted or unsubstituted C1 to C20 alkylene group;

[Chemical Formula 1A-II]

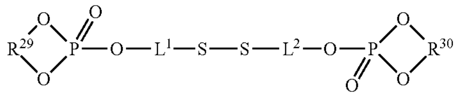

wherein, in Chemical Formula 1A-II, $R^{29}$ and $R^{30}$ are each independently a substituted or unsubstituted C2 to C10 alkylene group, and $L^1$ and $L^2$ are each independently a substituted or unsubstituted C1 to C20 alkylene group.

In an embodiment, $R^9$ to $R^{28}$ may each independently be hydrogen, a halogen group, or a substituted or unsubstituted C1 to C5 alkyl group, n1 to n4 may each independently be one of integers ranging from 0 to 3, and $L^1$ and $L^2$ may each independently be a substituted or unsubstituted C2 to C20 alkylene group.

In a specific example embodiment, $R^9$ to $R^{28}$ may each independently be hydrogen, a halogen group, or a substituted or unsubstituted C1 to C3 alkyl group, n1 to n4 may each independently be one of integers ranging from 0 to 2, and $L^1$ and $L^2$ may each independently be a substituted or unsubstituted C2 to C10 alkylene group.

In an embodiment, $R^{29}$ and $R^{39}$ may each independently be a substituted or unsubstituted C2 to C5 alkylene group, and $L^1$ and $L^2$ may each independently a substituted or unsubstituted C2 to C20 alkylene group.

In a specific embodiment, $R^{29}$ and $R^{39}$ may each independently a substituted or unsubstituted C2 to C4 alkylene group, and $L^1$ and $L^2$ may each independently be a substituted or unsubstituted C2 to C10 alkylene group.

For example, Chemical Formula 1A-II may be represented by Chemical Formula 1A-II-1 or Chemical Formula 1A-II-2.

[Chemical Formula 1A-II-1]

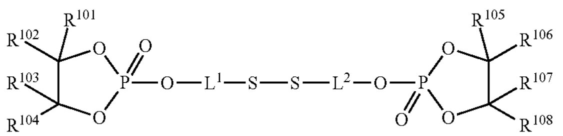

-continued

[Chemical Formula 1A-II-2]

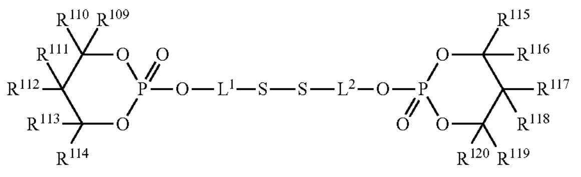

In Chemical Formula 1A-II-1 and Chemical Formula 1A-II-2, $R^{101}$ to $R^{120}$ are each independently hydrogen, a halogen group, or a substituted or unsubstituted C1 to C10 alkyl group, and $L^1$ and $L^2$ are the same as described above.

In an embodiment, $R^{101}$ to $R^{120}$ may each independently be hydrogen, a halogen group, or a substituted or unsubstituted C1 to C5 alkyl group.

In a specific embodiment, each of $R^{101}$ to $R^{120}$ may be hydrogen.

In another specific example, Chemical Formula 1B may be represented by Chemical Formula 1B-I or Chemical Formula 1B-II.

[Chemical Formula 1B-I]

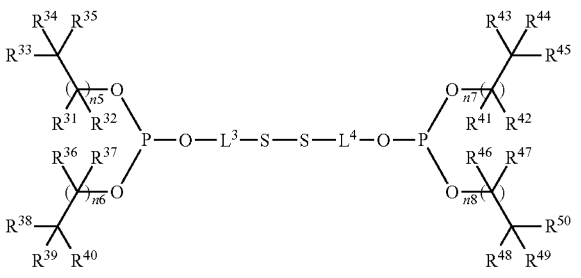

In Chemical Formula 1B-I, $R^{31}$ to $R^{50}$ are each independently hydrogen, a halogen group, or a substituted or unsubstituted C1 to C10 alkyl group, n5 to n8 are each independently one of integers ranging from 0 to 4, and $L^3$ and $L^4$ are each independently a substituted or unsubstituted C1 to C20 alkylene group;

[Chemical Formula 1B-II]

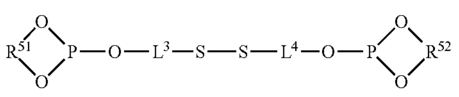

wherein, in Chemical Formula 1B-II, $R^{51}$ and $R^{52}$ are each independently a substituted or unsubstituted C2 to C10 alkylene group, and $L^3$ and $L^4$ are each independently a substituted or unsubstituted C1 to C20 alkylene group.

In an embodiment, $R^{31}$ to $R^{50}$ may each independently be hydrogen, a halogen group, or a substituted or unsubstituted C1 to C5 alkyl group, n5 to n8 may each independently be one of integers ranging from 0 to 3, and $L^3$ and $L^4$ may each independently be a substituted or unsubstituted C2 to C20 alkylene group.

In a specific embodiment, $R^{31}$ to $R^{50}$ may each independently be hydrogen, a halogen group, or a substituted or unsubstituted C1 to C3 alkyl group, n5 to n8 may each independently be one of integers ranging from 0 to 2, and $L^3$ and $L^4$ may each independently be a substituted or unsubstituted C2 to C10 alkylene group.

In an embodiment, $R^{51}$ and $R^{52}$ may each independently be a substituted or unsubstituted C2 to C5 alkylene group, and $L^3$ and $L^4$ may each independently be a substituted or unsubstituted C2 to C20 alkylene group.

In a specific embodiment, $R^{51}$ and $R^{52}$ may each independently be a substituted or unsubstituted C2 to C4 alkylene group, and $L^3$ and $L^4$ may each independently be a substituted or unsubstituted C2 to C10 alkylene group.

For example, Chemical Formula 1B-II may be represented by Chemical Formula 1B-II-1 or Chemical Formula 1B-II-2.

[Chemical Formula 1B-II-1]

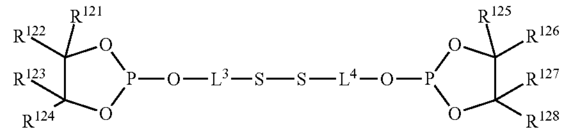

[Chemical Formula 1B-II-2]

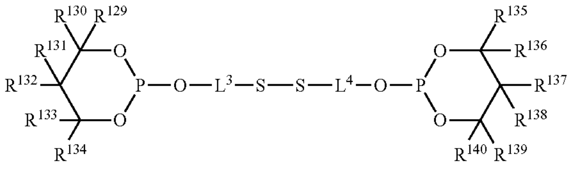

In Chemical Formula 1B-II-1 and Chemical Formula 1B-II-2, $R^{121}$ to $R^{140}$ are each independently hydrogen, a halogen group, or a substituted or unsubstituted C1 to C10 alkyl group, and $L^3$ and $L^4$ are the same as described above.

In an embodiment, $R^{121}$ to $R^{140}$ may each independently be hydrogen, a halogen group, or a substituted or unsubstituted C1 to C5 alkyl group.

In a specific embodiment, each of $R^{121}$ to $R^{140}$ may be hydrogen.

The second compound according to a specific example of the present invention may be represented by Chemical Formula 1A-II-3 or Chemical Formula 1B-II-3.

[Chemical Formula 1A-II-3]

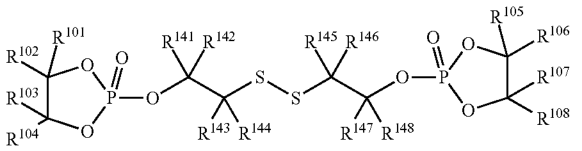

[Chemical Formula 1B-II-3]

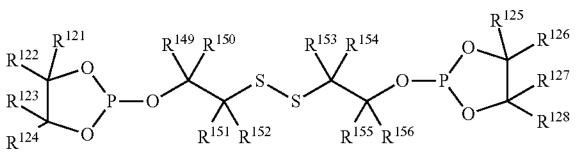

In Chemical Formula 1A-II-3 and Chemical Formula 1B-II-3, $R^{101}$ to $R^{108}$, $R^{121}$ to $R^{128}$, and $R^{141}$ to $R^{156}$ are each independently hydrogen, a halogen group, or a substituted or unsubstituted C1 to C10 alkyl group.

In an embodiment, $R^{101}$ to $R^{108}$, $R^{121}$ to $R^{128}$, and $R^{141}$ to $R^{156}$ may each independently be hydrogen, a halogen group, or a substituted or unsubstituted C1 to C5 alkyl group.

In a specific embodiment, each of $R^{101}$ to $R^{108}$, $R^{121}$ to $R^{128}$, and $R^{141}$ to $R^{156}$ may be hydrogen.

For example, the second compound may be included in an amount of 0.05 to 5 parts by weight, for example, 0.1 to 5 parts by weight, 0.1 to 3 parts by weight, or 0.5 to 3 parts by weight, based on 100 parts by weight of the electrolyte for the rechargeable lithium battery.

The composition may be included in an amount of 0.5 to 8.0 parts by weight, specifically, 0.5 to 7.0 parts by weight, 0.5 to 6.0 parts by weight, 0.5 to 5.0 parts by weight, or 0.5 to 3.0 parts by weight, based on 100 parts by weight of the electrolyte for the rechargeable lithium battery.

When the content range of the additives including the composition is as described above, it is possible to implement a rechargeable lithium battery with improved cycle-life characteristics by preventing an increase in resistance at high temperatures.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. The ester-based solvent may be methyl acetate, ethyl acetate, n-propyl acetate, t-butyl acetate, methyl propionate, ethyl propionate, propyl propionate, decanolide, mevalonolactone, caprolactone, and the like. The ether-based solvent may be dibutyl ether, tetraglyme, diglyme, dimethoxyethane, 2-methyltetrahydrofuran, tetrahydrofuran, and the like. In addition, the ketone-based solvent may be cyclohexanone, and the like. The alcohol-based solvent may include ethanol, isopropyl alcohol, and the like, and the aprotic solvent may include nitriles such as $R^{18}$—CN (wherein $R^{18}$ is a hydrocarbon group having a C2 to C20 linear, branched, or cyclic structure and may include a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture, and when used in a mixture, the mixing ratio may be appropriately adjusted in accordance with a desired battery performance, which is widely understood by those skilled in the art.

The carbonate-based solvent is prepared by mixing a cyclic carbonate and a chain carbonate. When the cyclic carbonate and chain carbonate are mixed together in a volume ratio of 1:9 to 9:1, a performance of the electrolyte may be improved.

In particular, in an embodiment, the non-aqueous organic solvent may include the cyclic carbonate and the chain carbonate in a volume ratio of 2:8 to 5:5, and as a specific example, the cyclic carbonate and the chain carbonate may be included in a volume ratio of 2:8 to 4:6.

More specifically, the cyclic carbonate and the chain carbonate may be included in a volume ratio of 2:8 to 3:7.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

[Chemical Formula 4]

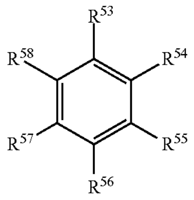

In Chemical Formula 4, $R^{53}$ to $R^{58}$ are the same or different and are hydrogen, a halogen, a C1 to C10 alkyl group, a haloalkyl group, or a combination thereof.

Specific examples of the aromatic hydrocarbon-based organic solvent 15 may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, 20 toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylene carbonate, vinyl ethylene carbonate, or an ethylene-based carbonate-based compound represented by Chemical Formula 5 as an additive to improve cycle-life of a battery.

[Chemical Formula 5]

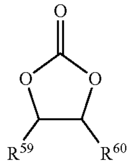

In Chemical Formula 5, $R^{59}$ and $R^{60}$ are the same or different, and are selected from hydrogen, a halogen, a cyano group (CN), a nitro group ($NO_2$), and a fluorinated C1 to C5 alkyl group, provided that at least one of $R^{59}$ and $R^{60}$ is selected from a halogen, a cyano group (CN), a nitro group ($NO_2$), and a fluorinated C1 to C5 alkyl group, and both $R^{59}$ and $R^{60}$ are not hydrogen.

Examples of the ethylene-based carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. When such an additive for improving cycle-life is further used, its amount may be appropriately adjusted.

The lithium salt dissolved in the non-organic solvent supplies lithium ions in a battery, enables a basic operation of a rechargeable lithium battery, and improves transportation of the lithium ions between positive and negative electrodes. Examples of the lithium salt may include at least one selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein x and y are natural numbers, for example an integer of 1 to 20), LiCl, LiI, $LiB(C_2O_4)_2$ (lithium bis(oxalato) borate: LiBOB), LiDFOB (lithium difluoro(oxalato)borate), and $Li[PF_2(C_2O_4)_2]$ (lithium difluoro (bis oxalato) phosphate). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The positive electrode includes a positive electrode current collector and a positive electrode active material layer on the positive electrode current collector, and the positive electrode active material layer includes a positive electrode active material.

The positive electrode active material may include lithiated intercalation compounds that reversibly intercalate and deintercalate lithium ions.

Specifically, one or more of a composite oxide of a metal selected from cobalt, manganese, nickel, and a combinationsthereof and lithium may be used.

Of course, one having a coating layer on the surface of the lithium composite oxide may be used, or a mixture of the composite oxide and a compound having a coating layer may be used. The coating layer may include one or more coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating process may include any conventional processes as long as it does not cause any side effects on the properties of the positive electrode active material (e.g., inkjet coating, dipping), which is well known to persons having ordinary skill in this art, so a detailed description thereof is omitted.

The positive electrode active material may be, for example, one or more of lithium composite oxides represented by Chemical Formula 6.

[Chemical Formula 6]

$$Li_xM^1_{1-y-z}M^2_yM^3_zO_{2-a}X_a$$

In Chemical Formula 6, $0.5\le x\le 1.8$, $0\le a\le 0.05$, $0<y\le 1$, $0\le z\le 1$, $0\le y+z\le 1$, $M^1$, $M^2$, and $M^3$ each independently include one or more element selected from a metal such as Ni, Co, Mn, Al, B, Ba, Ca, Ce, Cr, Fe, Mo, Nb, Si, Sr, Mg, Ti, V, W, Zr, or La, and a combination thereof, and X include one or more element selected from F, S, P, and Cl.

In an embodiment, the positive electrode active material may be one or more selected from $LiCoO_2$, $LiNiO_2$, $LiMnO_2$, $LiMn_2O_4$, $LiNi_aMn_bCo_cO_2$(a+b+c=1), $LiNi_aMn_bCo_cAl_dO_2$ (a+b+c+d=1), and $LiNi_eCo_fAl_gO_2$ (e+f+g=1).

In Chemical Formula 6, $0.8<y<1$, $0<z<0.2$, and M 1 may be Ni.

For example, in the case of $LiNi_aMn_bCo_cO_2$ (a+b+c=1) and $LiNi_aMn_bCo_cAl_dO_2$ (a+b+c+d=1), the nickel content may be greater than or equal to 60% ($a\ge 0.6$), and more specifically, greater than or equal to 80% ($a\ge 0.8$).

For example, in the case of $LiNi_eCo_fAl_gO_2$ (e+f+g=1), the nickel content may be greater than or equal to 60% ($e\ge 0.6$), and more specifically, greater than or equal to 80% ($e\ge 0.8$).

In a more specific embodiment, the positive electrode active material may be a lithium composite oxide represented by any one of Chemical Formulas 6-1 to 6-3.

[Chemical Formula 6-1]

$$Li_{x1}Ni_{y1}Co_{z1}Al_{1-y1-z1}O_2$$

In Chemical Formula 6-1, $1\le x1\le 1.2$, $0<y<1<1$, and $0<z1<1$.

[Chemical Formula 6-2]

$$Li_{x2}Ni_{y2}Co_{z2}Mn_{1-y2-z2}O_2$$

In Chemical Formula 6-2, $1\le x2\le 1.2$, $0<y2<1$, and $0<z2<1$.

[Chemical Formula 6-3]

$$Li_{x3}CoO_2$$

In Chemical Formula 6-3, $0.5<x3\le 1$.

For example, in Chemical Formula 6-1, $1\le x1\le 1.2$, $0.5\le y1<1$, and $0<z1\le 0.5$.

As a specific example, in Chemical Formula 6-1, $1\le x1\le 1.2$, $0.6\le y1<1$, and $0<z1\le 0.5$.

As a more specific example, in Chemical Formula 6-1, $1\le x1\le 1.2$, $0.7\le y1<1$, and $0<z1\le 0.5$.

For example, in Chemical Formula 6-1, $1\le x1\le 1.2$, $0.8\le y1<1$, and $0<z1\le 0.5$.

For example, in Chemical Formula 6-2, $1\le x1\le 1.2$, $0.8\le y1<1$, and $0<z1\le 0.5$.

As a specific example, in Chemical Formula 6-2, $1\le x2\le 1.2$, $0.6\le y2<1$, and $0.3\le z2<1$.

As a more specific example, in Chemical Formula 6-2, $1\le x2\le 1.2$, $0.7\le y2<1$, and $0.3\le z2<1$.

For example, in Chemical Formula 6-2, $1\le x2\le 1.2$, $0.8\le y2<1$, and $0.3\le z2<1$.

A content of the positive electrode active material may be 90 wt % to 98 wt % based on the total weight of the positive electrode active material layer.

In an embodiment of the present invention, the positive electrode active material layer may optionally include a conductive material and a binder. In this case, a content of the conductive material and the binder may be 1 wt % to 5 wt %, respectively, based on the total weight of the positive electrode active material layer.

The conductive material is included to impart conductivity to the positive electrode and any electrically conductive material may be used as a conductive material unless it causes a chemical change in the configured battery.

Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The positive electrode current collector may include Al, but is not limited thereto.

The negative electrode includes a negative electrode current collector and a negative electrode active material layer including a negative electrode active material formed on the negative electrode current collector.

The negative electrode active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions includes carbon materials. The carbon material may be any generally-used carbon-based negative electrode active material in a rechargeable lithium battery and examples of the carbon material include crystalline carbon, amorphous carbon, and a combination thereof. The crystalline carbon may be non-shaped, or sheet, flake, spherical, or fiber shaped natural graphite or artificial graphite and the amorphous carbon may be a soft carbon, a hard carbon, a mesophase pitch carbonization product, calcined coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, Si—C composite, $SiO_x$($0<x<2$), a Si-Q alloy wherein Q is an element selected from an alkali metal, an alkaline-earth metal, a Group 13 element, a Group 14 element, a Group 15 element, a Group 16 element, a transition metal, a rare earth element, and a combination thereof, but not Si), Sn, $SnO_2$, a Sn—$R^{61}$ alloy (wherein $R^{61}$ is an element selected from an alkali metal, an alkaline-earth metal, a Group 13 element, a Group 14 element, a Group 15 element, a Group 16 element, a transition metal, a rare earth element, and a combination thereof, but not Sn), and the like. One or more of these materials may be mixed with $SiO_2$.

The elements Q and $R^{61}$ may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof.

The transition metal oxide may be a vanadium oxide, a lithium vanadium oxide, and the like.

In a specific embodiment, the negative electrode active material may be graphite or may include a Si composite and graphite together.

When the negative electrode active material includes the Si composite and graphite together, the Si composite and graphite may be included in the form of a mixture, and the Si composite and graphite may be included in a weight ratio of 1:99 to 50:50. More specifically, the Si composite and graphite may be included in a weight ratio of 3:97 to 20:80 or 5:95 to 20:80.

The Si composite may include a core including Si-based particles and an amorphous carbon coating layer. For example, the Si-based particles may include a Si—C composite, $SiO_x$($0<x\leq2$), a Si alloy or mixture thereof. For example, the Si—C composite may include a core including Si particles and crystalline carbon, and an amorphous carbon coating layer on the surface of the core.

The crystalline carbon may include, for example, graphite, and more specifically, natural graphite, artificial graphite, or a mixture thereof.

An average particle diameter of the crystalline carbon may be 5 μm to 30 μm.

In the present specification, an average particle diameter may be a particle size (D50) at a volume ratio of 50% in a cumulative size-distribution curve.

In the Si—C composite, an average particle diameter of the Si particles may be 50 nm to 200 nm.

When the average particle diameter of the Si particles is within the above ranges, volume expansion occurring during charging and discharging may be suppressed, and interruption of a conductive path due to particle crushing during charging and discharging may be prevented.

The Si particles may be included in an amount of 1 wt % to 60 wt %, for example, 3 wt % to 60 wt %, based on the total weight of the Si—C composite.

The amorphous carbon may include soft carbon, hard carbon, a mesophase pitch carbonized product, calcined coke, or a mixture thereof.

The amorphous carbon may be included in an amount of 1 to 50 parts by weight, for example, 5 to 50 parts by weight, or 10 to 50 parts by weight based on 100 parts by weight of the crystalline carbon.

In the negative electrode active material layer, the negative electrode active material may be included in an amount of 95 wt % to 99 wt % based on the total weight of the negative electrode active material layer.

In an embodiment, the negative electrode active material layer may include a binder, and optionally a conductive material. The content of the binder in the negative electrode active material layer may be 1 wt % to 5 wt % based on the total weight of the negative electrode active material layer. In addition, when the conductive material is further included, 90 wt % to 98 wt % of the negative electrode active material, 1 wt % to 5 wt % of the binder, and 1 wt % to 5 wt % of the conductive material may be used.

The binder improves binding properties of negative electrode active material particles with one another and with a current collector. The binder may be a non-water-soluble binder, a water-soluble binder, or a combination thereof.

The non-water-soluble binder may be polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, ethylenepropyleneco polymer, polyethylene oxide, polyvinylpyrrolidone, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 to 3 parts by weight based on 100 parts by weight of the negative electrode active material.

The conductive material is included to improve electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The negative electrode current collector may be selected from a copper foil, a nickel foil, a stainless-steel foil, a titanium foil, a nickel foam, a copper foam, a polymer substrate coated with a conductive metal, and a combination thereof.

The rechargeable lithium battery may further include a separator between the negative electrode and the positive electrode, depending on a type of the battery. Such a separator may be a porous substrate or a composite porous substrate.

The porous substrate may be a substrate including pores, and lithium ions may move through the pores. The porous substrate may for example include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The composite porous substrate may have a form including a porous substrate and a functional layer on the porous substrate. The functional layer may be, for example, one or more of a heat-resistant layer and an adhesive layer from the viewpoint of enabling additional function. For example, the heat-resistant layer may include a heat-resistant resin and optionally a filler.

In addition, the adhesive layer may include an adhesive resin and optionally a filler.

The filler may be an organic filler or an inorganic filler.

DETAILED DESCRIPTION OF THE EMBODIMENTS

Hereinafter, examples of the present invention and comparative examples are described. These examples, however, are not in any sense to be interpreted as limiting the scope of the invention.

Preparation of Additive

Synthesis Example 1: Compound of Chemical Formula a-1

[Reaction Scheme 1]

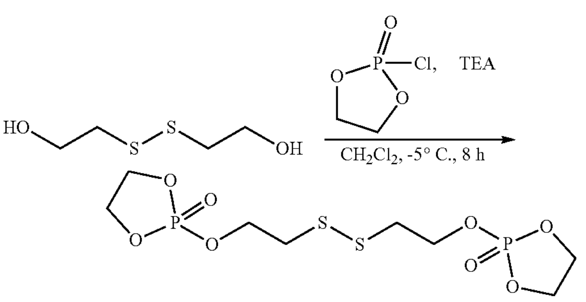

a-1

After setting a temperature at −5° C. under a nitrogen atmosphere, bis(2-hydroxyethyl)disulfide (6.8 g, 0.04 mol) and triethylamine (8.9 g, 0.09 mol) were added to 50 mL of dried dichloromethane. This mixed solution was slowly added in a dropwise fashion to 100 mL of a dried dichloromethane solution in which 2-chloro-2-oxo-1,3,2-dioxaphospholane (COP: 2-chloro-2-oxo-1,3,2-dioxaphospholane) (12.54 g, 0.088 mol) was dissolved. After stirring the mixture for 8 hours, salt produced therein was filtered and removed, and a filtrate therefrom was dried. Subsequently, 50 mL of toluene was added to the dried mixture, obtaining a white solid produced therein (12.9 g, 88%); $^1H$ NMR (400 MHz, $CDC_3$): δ4.40 (m, 12H), 3.01 (m, 4H); $^{31}P$ NMR: δ17.98

Synthesis Example 2: Compound of Chemical Formula a-2

[Reaction Scheme 2]

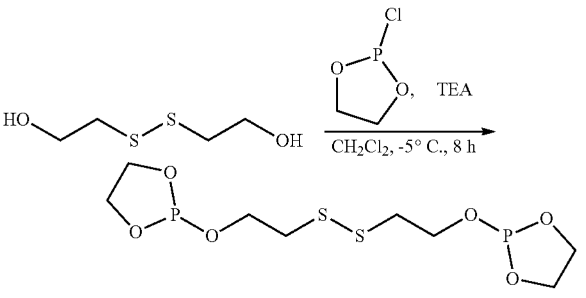

a-2

After setting a temperature at −5° C. under a nitrogen atmosphere, bis(2-hydroxyethyl) disulfide (6.8 g, 0.04 mol) and triethylamine (8.9 g, 0.09 mol) were added to 50 mL of dried dichloromethane. This mixed solution was slowly added in a dropwise fashion to 100 mL of a dichloromethane solution in which 2-chloro-1,3,2-dioxaphospholane (11.1 g, 0.09 mol) was dissolved. After stirring the mixture for 8 hours, salt produced therein was filtered and removed, and a filtrate therefrom was dried. 50 mL of diehtly ether was added to the dried mixture, and after removing salt produced therein, a filtrate therefrom was dried, obtaining transparent oil. (10.7 g, 80%); $^{1}H$ NMR (400 MHz, $CDCl_3$): δ4.24 (m, 4H), 3.98 (m, 8H), 2.81 (m, 4H); $^{31}P$ NMR: δ137.11

Manufacture of Rechargeable Lithium Battery Cells

Example 1

$LiNi_{0.88}Co_{0.07}Al_{0.05}O_2$ as a positive electrode active material, polyvinylidene fluoride as a binder, and ketjen black as a conductive material were mixed in a weight ratio of 97:2:1 and then, dispersed in N-methyl pyrrolidone, preparing positive electrode active material slurry.

The positive electrode active material slurry was coated on a 14 μm-thick Al foil, dried at 110° C., and pressed, manufacturing a positive electrode.

A negative electrode active material prepared by mixing artificial graphite and an Si—C composite in a weight ratio of 93:7, a styrene-butadiene rubber binder as a binder, and carboxylmethyl cellulose as a thickener were mixed in a weight ratio of 97:1:2 and then, dispersed in distilled water, preparing negative electrode active material slurry.

The Si—C composite included a core including artificial graphite and silicon particles and coal-based pitch coated on the surface of the core.

The negative electrode active material slurry was coated on a 10 μm-thick Cu and then, dried at 100° C. and pressed, manufacturing a negative electrode.

The positive electrode and the negative electrode were assembled with a 25 μm-thick polyethylene separator to manufacture an electrode assembly, and an electrolyte was injected thereinto, manufacturing a rechargeable lithium battery cell.

The electrolyte has a composition as follows.

(Composition of the electrolyte)

Salt: 1.5 M $LiPF_6$

Solvent: ethylene carbonate: ethylmethyl carbonate: dimethyl carbonate (EC: EMC:DMC=a volume ratio of 20:10:70)

Additive: a composition including 0.5 parts by weight of cesium bis(trifluoromethanesulfonyl)imide ($Cs(CF_3SO_2)_2N$) represented by Chemical Formula 2-2 and 0.5 parts by weight of the compound represented by Chemical Formula a-1

(However, in the composition of the electrolyte, “parts by weight” means a relative weight of additives based on 100 weight of the total electrolyte (lithium salt+non-aqueous organic solvent))

[Chemical Formula 2-2]

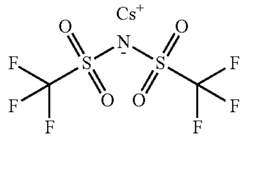

Examples 2 to 8

Rechargeable lithium battery cells were manufactured in the same method as in Example 1 except that the composition was changed into each composition shown in Table 1.

Comparative Example 1

A rechargeable lithium battery cell was manufactured in the same manner as in Example 1 except that an electrolyte not including the additive was used.

Comparative Example 2

A rechargeable lithium battery cell was manufactured in the same manner as in Example 2 except that an additive not using the compound represented by Chemical Formula a-1 was used to prepare an electrolyte.

Comparative Example 3

A rechargeable lithium battery cell was manufactured in the same manner as in Example 1 except that an additive not using the compound represented by Chemical Formula a-1 was used to prepare an electrolyte.

Comparative Example 4

A rechargeable lithium battery cell was manufactured in the same manner as in Example 1 except that an additive not using the compound represented by Chemical Formula 2-2 was used to prepare an electrolyte.

Comparative Example 5

A rechargeable lithium battery cell was manufactured in the same manner as in Example 1 except that $Li(CF_3SO_2)_2N$ was used instead of the cesium bis(trifluoromethanesulfonyl)imide represented by Chemical Formula 2-2.

Comparative Example 6

A rechargeable lithium battery cell was manufactured in the same manner as in Example 3 except that an additive not using the compound represented by Chemical Formula 2-2 was used to prepare an electrolyte.

Comparative Example 7

A rechargeable lithium battery cell was manufactured in the same manner as in Example 3 except that $Li(CF_3SO_2)_2N$ was used instead of the cesium bis(trifluoromethanesulfonyl)imide represented by Chemical Formula 2-2 to prepare an electrolyte.

TABLE 1

| | Additive composition | |
|---|---|---|
| | First compound (parts by weight) | Second compound (parts by weight) |
| Comparative Example 1 | — | — |
| Comparative Example 2 | Chemical Formula 2-1 (0.5) | — |
| Comparative Example 3 | Chemical Formula 2-2 (0.5) | — |
| Comparative Example 4 | — | Chemical Formula a-1 (0.5) |
| Comparative Example 5 | $Li(CF_3SO_2)_2N$ (0.5) | Chemical Formula a-1 (0.5) |
| Comparative Example 6 | — | Chemical Formula a-2 (0.5) |
| Comparative Example 7 | $Li(CF_3SO_2)_2N$ (0.5) | Chemical Formula a-2 (0.5) |

TABLE 1-continued

| | Additive composition | |
|---|---|---|
| | First compound (parts by weight) | Second compound (parts by weight) |
| Example 1 | Chemical Formula 2-2 (0.5) | Chemical Formula a-1 (0.5) |
| Example 2 | Chemical Formula 2-1 (0.5) | Chemical Formula a-1 (0.5) |
| Example 3 | Chemical Formula 2-2 (0.5) | Chemical Formula a-2 (0.5) |
| Example 4 | Chemical Formula 2-1 (0.5) | Chemical Formula a-2 (0.5) |
| Example 5 | Chemical Formula 2-2 (0.5) | Chemical Formula a-1 (1) |
| Example 6 | Chemical Formula 2-1 (0.5) | Chemical Formula a-1 (1) |
| Example 7 | Chemical Formula 2-2 (0.5) | Chemical Formula a-2 (1) |
| Example 8 | Chemical Formula 2-1 (0.5) | Chemical Formula a-2 (1) |

Evaluation 1: Evaluation of Initial Resistance Characteristics

Initial DC-IR was measured in the following method.

The cells according to Examples 1 to 8 and Comparative Examples 1 to 7 were charged at 4.2 V and 4 A at room temperature (25° C.), cut off at 100 mA, and paused for 30 minutes. Subsequently, the cells were respectively discharged at 10 A for 10 seconds, 1 A and 10 seconds, and 10 A and 4 seconds and then, measured with respect to a current and a voltage respectively at 18 seconds and 23 seconds to calculate initial resistance (a difference between resistance at 18 seconds and resistance at 23 seconds) according to $\Delta R=\Delta V/\Delta I$.

Evaluation 2: Evaluation of Room-temperature Cycle-life Characteristics

The rechargeable lithium battery cells according to Examples 1 to 8 and Comparative Examples 1 to 7 were 100 cycles charged and discharged within 2.75 V to 4.2 V at a C-rate of 0.5 C at room temperature (25° C.) and then, measured with respect to a change in discharge capacity to calculate a capacity ratio of the discharge capacity at the $100^{th}$ cycle to the discharge capacity at the $1^{st}$ cycle (capacity retention), and the results are shown in Table 2.

Evaluation 3: Evaluation of High-temperature (90° C.) Leaving Characteristics The rechargeable lithium battery cells according to Examples 1 to 8 and Comparative Examples 1 to 7 were measured with respect to time when CID was OPEN, after being left in a state of charge (SOC=100%) at 90° C., and the results are shown in Table 2.

Evaluation 4: Evaluation of Thermal Exposure

Each rechargeable lithium battery cell according to Examples 1 to 8 and Comparative Examples 1 to 7 was left in a state of charge (SOC=100%) at 142° C., ignition was recorded, and the results are shown in Table 2.

Evaluation 5: Evaluation of Penetration

Each rechargeable lithium battery cell according to Examples 1 to 8 and Comparative Examples 1 to 7 was evaluated with respect to penetration characteristics by twice penetrating the cells in SOC 50 with a 3 1 pin at 150 mm/s and recording whether the cells ignited or not, and the results are shown in Table 2.

(Evaluation Criteria)

L0: no change in appearance

L1: leakage

L2: fumes, exothermic at less than 200° C.

L3: smoke, fine spark ejection, exothermic at 200° C. to 400° C.

L4: ignition

L5: explosion, rupture

TABLE 2

| | Initial DC-IR (mohm) | Room-temperature capacity retention (%) | 90° C. leaving charac-teristics (hr) | Heat exposure result (140° C.) | Penetration result (3 pi, 150 mm/) |
|---|---|---|---|---|---|
| Comparative Example 1 | 34.9 | 84.2 | 36.5 | NG | L4/L4 |
| Comparative Example 2 | 35.1 | 84.3 | 35.3 | OK | L3/L3 |
| Comparative Example 3 | 35.0 | 84.5 | 38.1 | OK | L3/L3 |
| Comparative Example 4 | 36.5 | 85.0 | 60.2 | NG | L4/L4 |
| Comparative Example 5 | 36.6 | 84.9 | 59.2 | NG | L4/L4 |
| Comparative Example 6 | 36.8 | 84.4 | 95.2 | NG | L4/L4 |
| Comparative Example 7 | 36.7 | 84.5 | 93.1 | NG | L4/L4 |
| Example 1 | 36.3 | 85.2 | 59.8 | OK | L3/L3 |
| Example 2 | 36.2 | 85.5 | 57.5 | OK | L3/L3 |
| Example 3 | 36.6 | 84.9 | 90.3 | OK | L3/L3 |
| Example 4 | 36.5 | 85.0 | 89.8 | OK | L3/L3 |
| Example 5 | 36.8 | 84.7 | 88.7 | OK | L3/L3 |
| Example 6 | 36.6 | 84.6 | 89.1 | OK | L3/L3 |
| Example 7 | 36.7 | 84.6 | 112.3 | OK | L3/L3 |
| Example 8 | 36.6 | 84.5 | 111.9 | OK | L3/L3 |

The rechargeable lithium battery cells using the composition of the specific mixed combination as an additive according to the present example embodiment turned out to realize excellent high-temperature characteristics and safety without deteriorating cycle-life characteristics and gas generation suppression performance during the high-temperature storage.

Referring to Table 2, the rechargeable lithium battery cells according to Examples 1 to 8 exhibited improved thermal safety and penetration stability and maintained equivalent DC resistance increase rate, room temperature capacity retention characteristics, and high-temperature leaving characteristics to the cells according to Comparative Examples 1 to 7.

In summary, the rechargeable lithium battery cells according to Examples 1 to 8 particularly exhibited excellent thermal safety and penetration stability, compared with the rechargeable lithium battery cells according to Comparative Examples 1 to 7.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An electrolyte for a rechargeable lithium battery, comprising a non-aqueous organic solvent, a lithium salt, and an additive, wherein the additive includes a composition including a first compound and a second compound, and the first compound is a cesium salt compound and the second compound is represented by Chemical Formula 1A or Chemical Formula 1B:

[Chemical Formula 1A]

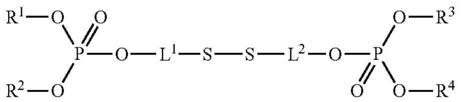

[Chemical Formula 1B]

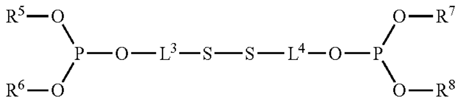

wherein, in Chemical Formula 1A and Chemical Formula 1B, $R^1$ to $R^8$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group or a substituted or unsubstituted C6 to C20 aryl group, $R^1$ to $R^8$ are each independently present, or at least one selected from a group comprising $R^1$ and $R^2$; $R^3$ and $R^4$; $R^5$ and $R^6$; and $R^7$ and $R^8$ are linked to form a substituted or unsubstituted monocyclic or polycyclic aliphatic heterocycle or a substituted or unsubstituted monocyclic or polycyclic aromatic heterocycle, and $L^1$ to $L^4$ are each independently a substituted or unsubstituted C1 to C20 alkylene group.

2. The electrolyte for a rechargeable lithium battery of claim 1, wherein an anion of the cesium salt compound is an imide-based anion or a phosphate-based anion.

3. The electrolyte for a rechargeable lithium battery of claim 1, wherein the cesium salt compound is represented by Chemical Formula 2 or 3:

[Chemical Formula 2]

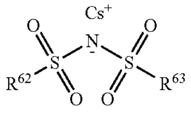

[Chemical Formula 3]

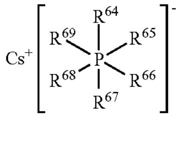

wherein, in Chemical Formula 2 and Chemical Formula 3, $R^{62}$ to $R^{69}$ are each independently a fluoro group or a C1 to C4 fluoroalkyl group substituted with at least one fluoro group.

4. The electrolyte for a rechargeable lithium battery of claim 3, wherein

Chemical Formula 2 is represented by Chemical Formula 2-1 or 2-2:

[Chemical Formula 2-1]

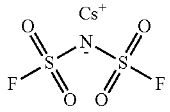

[Chemical Formula 2-2]

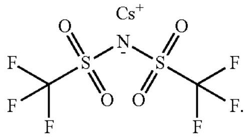

5. The electrolyte for a rechargeable lithium battery of claim 3, wherein

Chemical Formula 3 is represented by Chemical Formula 3-1:

[Chemical Formula 3-1]

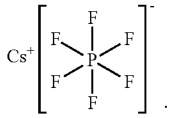

6. The electrolyte for a rechargeable lithium battery of claim 1, wherein the first compound is included in an amount of 0.05 to 3 parts by weight based on 100 parts by weight of the electrolyte for the rechargeable lithium battery.

7. The electrolyte for a rechargeable lithium battery of claim 1, wherein

Chemical Formula 1A is represented Chemical Formula 1A-I or Chemical Formula 1A-II:

[Chemical Formula 1A-I]

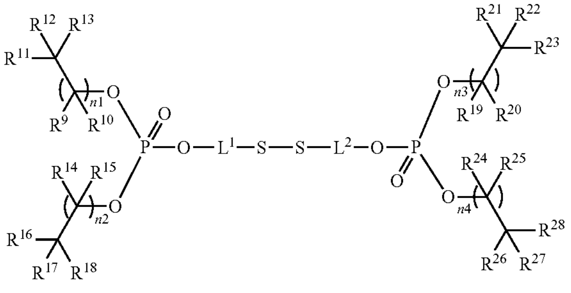

wherein, in Chemical Formula 1A-I, $R^9$ to $R^{28}$ are each independently hydrogen, a halogen group, or a substituted or unsubstituted C1 to C10 alkyl group, n1 to n4 are each independently one of integers ranging from 0 to 4, and $L^1$ and $L^2$ are each independently a substituted or unsubstituted C1 to C20 alkylene group;

[Chemical Formula 1A-II]

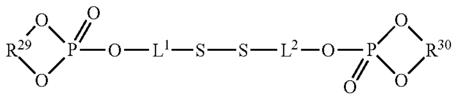

wherein, in Chemical Formula 1A-II, $R^{29}$ and $R^{30}$ are each independently a substituted or unsubstituted C2 to C10 alkylene group, $L^1$ and $L^2$ are each independently a substituted or unsubstituted C1 to C20 alkylene group.

8. The electrolyte for a rechargeable lithium battery of claim 7, wherein Chemical Formula 1A-II is represented by Chemical Formula 1A-II-1 or Chemical Formula 1A-II-2:

[Chemical Formula 1A-II-1]

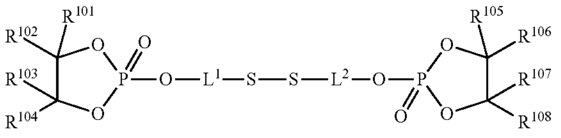

[Chemical Formula 1A-II-2]

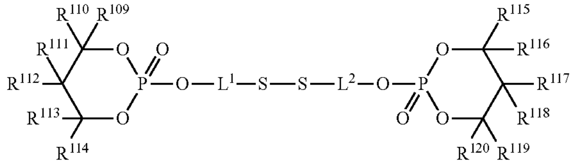

wherein, in Chemical Formula 1A-II-1 and Chemical Formula 1A-II-2, $R^{101}$ to $R^{120}$ are each independently hydrogen, a halogen group, or a substituted or unsubstituted C1 to C10 alkyl group, and $L^1$ and $L^2$ are each independently a substituted or unsubstituted C1 to C20 alkylene group.

9. The electrolyte for a rechargeable lithium battery of claim 1, wherein Chemical Formula 1B is represented by Chemical Formula 1B-I or Chemical Formula 1B-II:

[Chemical Formula 1B-I]

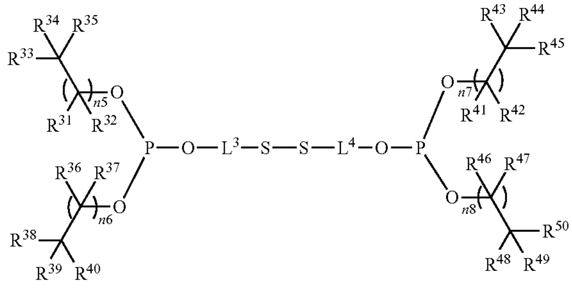

wherein, in Chemical Formula 1B-I, $R^{31}$ to $R^{50}$ are each independently hydrogen, a halogen group, or a substituted or unsubstituted C1 to C10 alkyl group, n5 to n8 are each independently one of integers ranging from 0 to 4, and $L^3$ and $L^4$ are each independently a substituted or unsubstituted C1 to C20 alkylene group;

[Chemical Formula 1B-II]

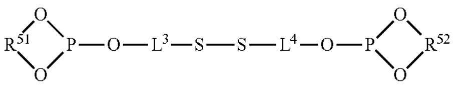

wherein, in Chemical Formula 1B-II, $R^{51}$ and $R^{52}$ are each independently a substituted or unsubstituted C2 to C10 alkylene group, and $L^3$ and $L^4$ are each independently a substituted or unsubstituted C1 to C20 alkylene group.

10. The electrolyte for a rechargeable lithium battery of claim 9, wherein Chemical Formula 1B-II is represented by Chemical Formula 1B-II-1 or Chemical Formula 1B-II-2:

[Chemical Formula 1B-II-1]

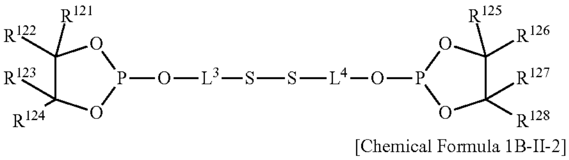

[Chemical Formula 1B-II-2]

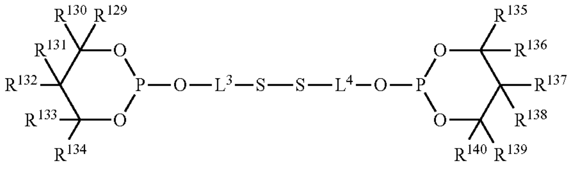

wherein, in Chemical Formula 1B-II-1 and Chemical Formula 1B-II-2, $R^{121}$ to $R^{140}$ are each independently hydrogen, a halogen group, or a substituted or unsubstituted C1 to C10 alkyl group, and $L^3$ and $L^4$ are each independently a substituted or unsubstituted C1 to C20 alkylene group.

11. The electrolyte for a rechargeable lithium battery of claim 1, wherein the second compound is represented by Chemical Formula 1A-II-3 or Formula 1B-II-3:

[Chemical Formula 1A-II-3]

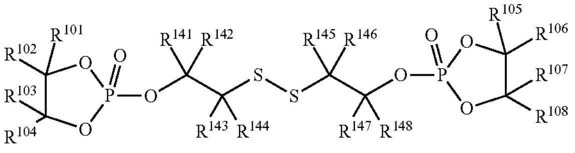

[Chemical Formula 1B-II-3]

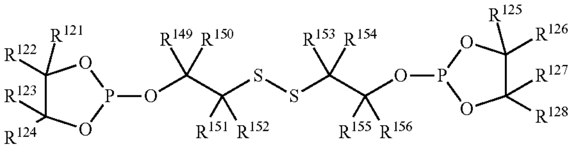

wherein, in Chemical Formula 1A-II-3 and Chemical Formula 1B-II-3, $R^{101}$ to $R^{108}$, $R^{121}$ to $R^{128}$, and $R^{141}$ to $R^{156}$ are each independently hydrogen, a halogen group, or a substituted or unsubstituted C1 to C10 alkyl group.

12. The electrolyte for a rechargeable lithium battery of claim 1, wherein the second compound includes in an amount of 0.05 to 5 parts by weight based on 100 parts by weight of the electrolyte for the rechargeable lithium battery.

13. The electrolyte for a rechargeable lithium battery of claim 1, wherein the composition includes in an amount of 0.5 to 8.0 parts by weight based on 100 parts by weight of the electrolyte for the rechargeable lithium battery.

14. A rechargeable lithium battery, comprising a positive electrode including a positive electrode active material;

a negative electrode including a negative electrode active material; and the electrolyte for the rechargeable lithium battery of claim 1.

15. The rechargeable lithium battery of claim 14, wherein the positive electrode active material is represented by Chemical Formula 6:

[Chemical Formula 6]

$$Li_xM^1_yM^2_zM^3_{1-y-z}O_{2-a}X_a$$

wherein, in Chemical Formula 6, $0.5 \leq x \leq 1.8$, $0 \leq a \leq 0.05$, $0 < y \leq 1$, $0 \leq z \leq 1$, $0 \leq y+z \leq 1$, $M^1$, $M^2$, and $M^3$ each independently include one or more element selected from a metal of Ni, Co, Mn, Al, B, Ba, Ca, Ce, Cr, Fe, Mo, Nb, Si, Sr, Mg, Ti, V, W, Zr, or La, and a combination thereof, and X include one or more element selected from F, S, P, and Cl.

16. The rechargeable lithium battery of claim 15, wherein in Chemical Formula 6, $0.8 \leq y \leq 1$, $0 \leq z \leq 0.2$, $M^1$ is Ni.

17. The rechargeable lithium battery of claim 14, wherein the negative electrode active material is graphite or includes a Si composite and graphite together.

18. The rechargeable lithium battery of claim 17, wherein the Si composite includes a core including Si-based particles and an amorphous carbon coating layer on the core.

19. The rechargeable lithium battery of claim 18, wherein the Si-based particle includes one or more of a Si-C composite, $SiO_x$ ($0 < x \leq 2$), and a Si alloy.

20. The rechargeable lithium battery of claim 19, wherein the Si-C composite includes a core including Si particles and crystalline carbon and an amorphous carbon coating layer on the surface of the core, and average particle diameter of the Si particles is 50 nm to 200 nm.

* * * * *